US011546535B2

(12) United States Patent
Ohmiya et al.

(10) Patent No.: US 11,546,535 B2
(45) Date of Patent: Jan. 3, 2023

(54) ABNORMAL-PIXEL DETECTING DEVICE, IMAGE FORMING APPARATUS, AND METHOD OF DETECTING ABNORMAL PIXEL

(71) Applicants: Yutaka Ohmiya, Tokyo (JP); Hideki Hashimoto, Tokyo (JP); Masamoto Nakazawa, Kanagawa (JP)

(72) Inventors: Yutaka Ohmiya, Tokyo (JP); Hideki Hashimoto, Tokyo (JP); Masamoto Nakazawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 314 days.

(21) Appl. No.: 16/925,391

(22) Filed: Jul. 10, 2020

(65) Prior Publication Data

US 2021/0014441 A1  Jan. 14, 2021

(30) Foreign Application Priority Data

Jul. 12, 2019 (JP) .............................. JP2019-130527

(51) Int. Cl.
*H04N 5/3745* (2011.01)
*H04N 5/365* (2011.01)
*H04N 5/367* (2011.01)
*H04N 1/407* (2006.01)
*H04N 1/60* (2006.01)
*H04N 5/378* (2011.01)

(52) U.S. Cl.
CPC ........... *H04N 5/367* (2013.01); *H04N 1/6027* (2013.01); *H04N 5/378* (2013.01); *H04N 5/37455* (2013.01)

(58) Field of Classification Search
None
See application file for complete search history.

(56) References Cited

U.S. PATENT DOCUMENTS

| 4,873,428 A * | 10/1989 | Takeuchi ............. H04N 1/4072 250/214 DC |
| 2008/0252787 A1 | 10/2008 | Nakazawa et al. |
| 2010/0321537 A1* | 12/2010 | Zamfir ................... G06T 5/005 348/241 |
| 2013/0321678 A1* | 12/2013 | Cote ...................... H04N 5/142 382/167 |
| 2014/0211273 A1 | 7/2014 | Konno et al. |
| 2015/0098117 A1 | 4/2015 | Marumoto et al. |
| 2015/0163378 A1 | 6/2015 | Konno et al. |

(Continued)

FOREIGN PATENT DOCUMENTS

| JP | 2001-285594 | 10/2001 |
| JP | 2011-155535 | 8/2011 |
| JP | 2018-006890 | 1/2018 |

*Primary Examiner* — Mark T Monk
(74) *Attorney, Agent, or Firm* — Xsensus LLP

(57) ABSTRACT

An abnormal-pixel detecting device includes an image sensor and an image processor. The image sensor is configured to capture an image of a subject. The image processor is configured to calculate: a ratio between a first plurality of pixel values captured by the image sensor and a second plurality of pixel values whose reference position is shifted relative to the first plurality of pixel values in a main scanning direction to obtain a third plurality of pixel values; and detect an abnormal pixel in the third plurality of pixel values.

18 Claims, 16 Drawing Sheets

(56) References Cited

U.S. PATENT DOCUMENTS

| | | |
|---|---|---|
| 2016/0003673 A1 | 1/2016 | Hashimoto et al. |
| 2017/0295298 A1 | 10/2017 | Ozaki et al. |
| 2019/0327387 A1 | 10/2019 | Hashimoto et al. |
| 2019/0335061 A1 | 10/2019 | Nakazawa et al. |
| 2020/0053229 A1 | 2/2020 | Hashimoto et al. |
| 2020/0053230 A1 | 2/2020 | Nakazawa et al. |
| 2020/0053233 A1 | 2/2020 | Nakazawa et al. |

\* cited by examiner

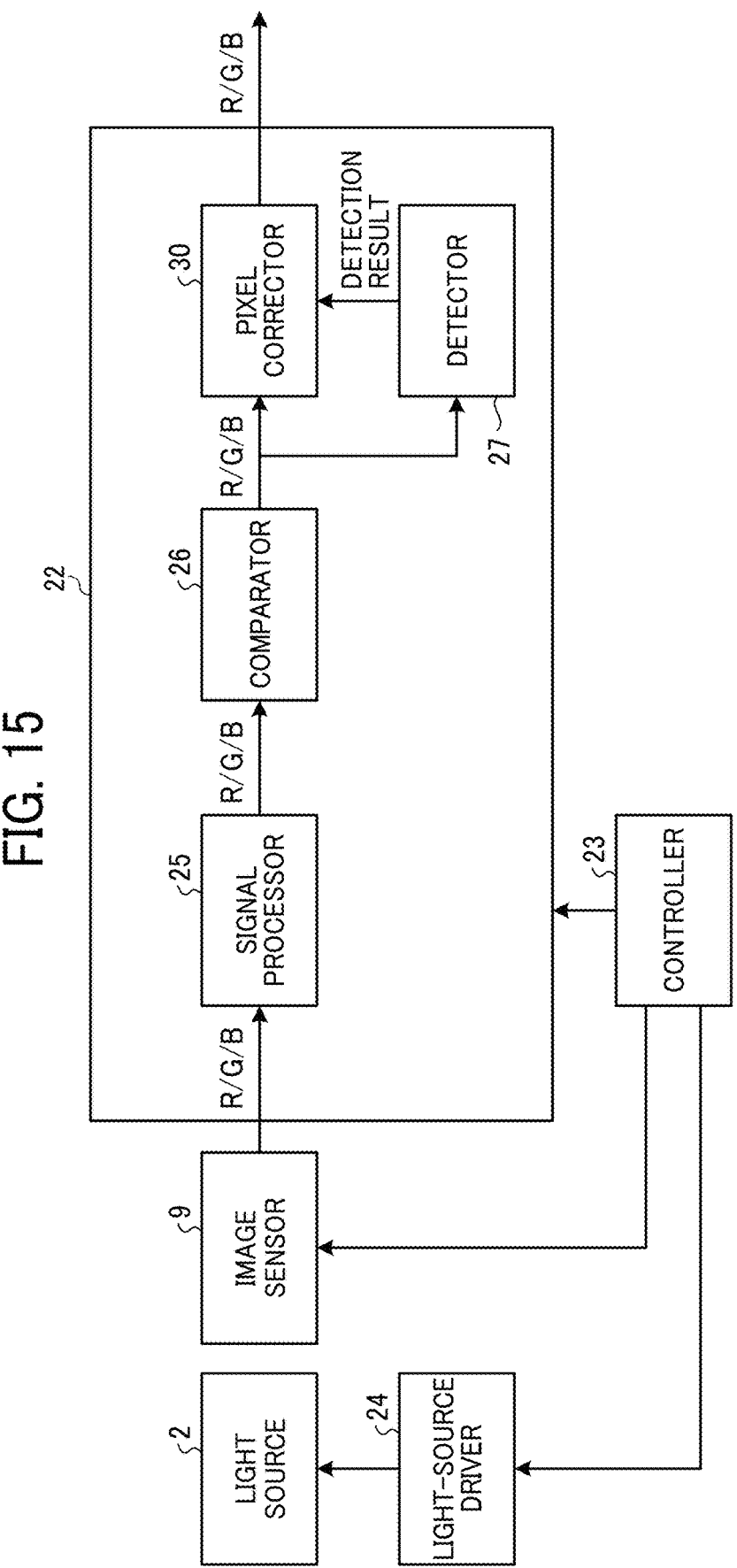

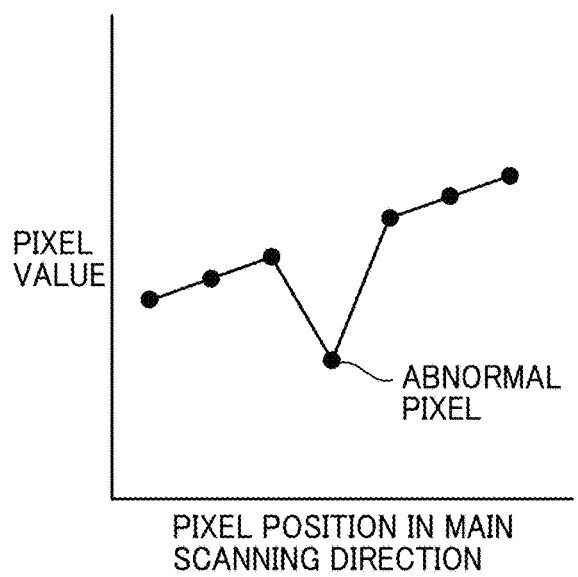 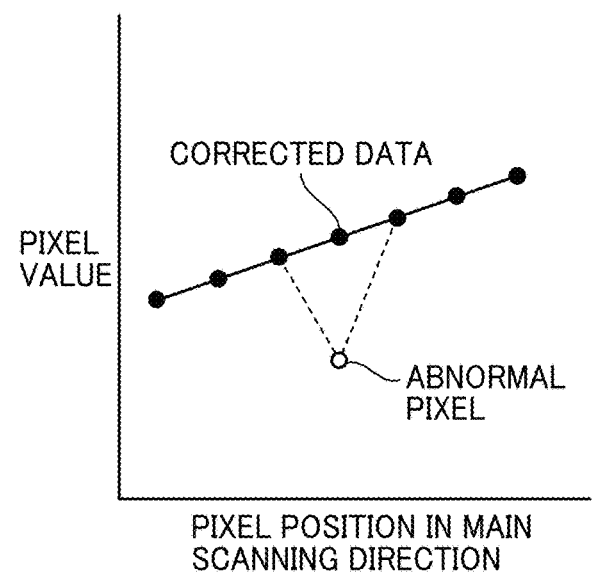
FIG. 16A
FIG. 16B

ABNORMAL-PIXEL DETECTING DEVICE, IMAGE FORMING APPARATUS, AND METHOD OF DETECTING ABNORMAL PIXEL

CROSS-REFERENCE TO RELATED APPLICATION

This patent application is based on and claims priority pursuant to 35 U.S.C. § 119(a) to Japanese Patent Application No. 2019-130527, filed on Jul. 12, 2019, in the Japan Patent Office, the entire disclosure of which is incorporated by reference herein.

BACKGROUND

Technical Field

Embodiments of the present disclosure relate to an abnormal-pixel detecting device, an image forming apparatus, and a method of detecting an abnormal pixel.

Related Art

When a foreign substance exists on an optical path for receiving reflected light from a white reference plate of an image reader or an original document, shading correction data may not be uniform. If shading correction is performed on the read image data using the shading correction data, a streak may occur in the sub-scanning direction. Therefore, there are known techniques for detecting a foreign substance on a white reference plate or an optical path.

SUMMARY

In an aspect of the present disclosure, there is provided an abnormal-pixel detecting device that includes an image sensor and an image processor. The image sensor is configured to capture an image of a subject. The image processor is configured to calculate: a ratio between a first plurality of pixel values captured by the image sensor and a second plurality of pixel values whose reference position is shifted relative to the first plurality of pixel values in a main scanning direction to obtain a third plurality of pixel values; and detect an abnormal pixel in the third plurality of pixel values.

In another aspect of the present disclosure, there is provided an image forming apparatus that includes an image forming device and the abnormal-pixel detecting device.

In still another aspect of the present disclosure, there is provided a method of detecting an abnormal pixel in an abnormal-pixel detecting device including an image sensor to capture an image of a subject. The method includes: calculating a ratio between a first plurality of pixel values captured by the image sensor and a second plurality of pixel values whose reference position is shifted relative to the first plurality of pixel values in a main scanning direction to obtain a third plurality of pixel values; and detecting an abnormal pixel in the third plurality of pixel values.

BRIEF DESCRIPTION OF THE DRAWINGS

The aforementioned and other aspects, features, and advantages of the present disclosure would be better understood by reference to the following detailed description when considered in connection with the accompanying drawings, wherein:

FIG. 15 is a block diagram illustrating electrical connections of units relating to abnormal-pixel detection of an image reader according to a sixth embodiment of the present disclosure; and FIGS. 16A and 16B are conceptual diagrams illustrating abnormal-pixel correction. The accompanying drawings are intended to depict embodiments of the present disclosure and should not be interpreted to limit the scope thereof. The accompanying drawings are not to be considered as drawn to scale unless explicitly noted.

DETAILED DESCRIPTION

Figure 1:
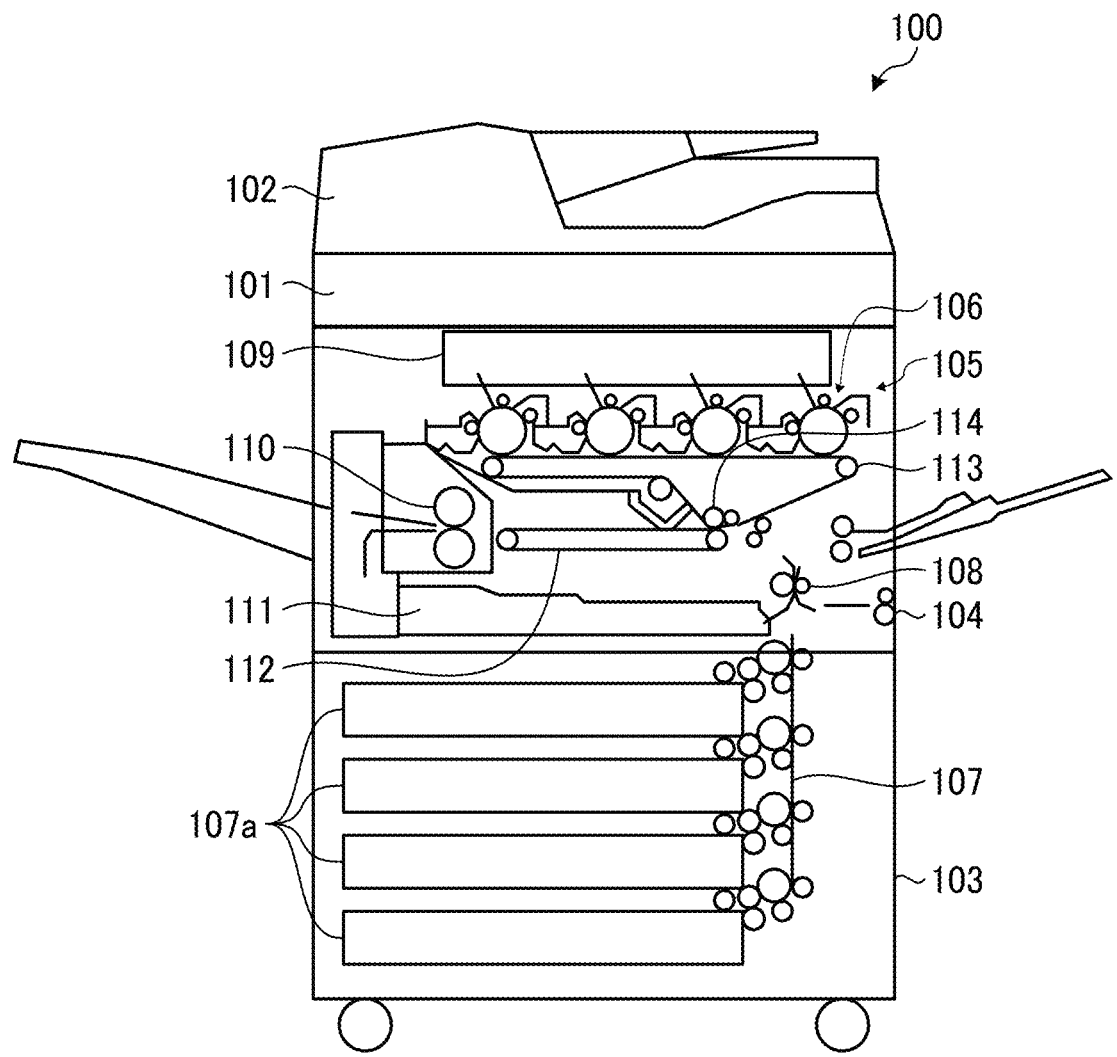
FIG. 1 is a diagram illustrating an example of a configuration of an image processing apparatus according to a first embodiment of the present disclosure.

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results. As used herein, the singular forms "a", "an", and "the" are intended to include the plural forms as well, unless the context clearly indicates otherwise.

Although the embodiments are described with technical limitations with reference to the attached drawings, such description is not intended to limit the scope of the disclosure and all of the components or elements described in the embodiments of this disclosure are not necessarily indispensable.

Hereinafter, embodiments of an abnormal-pixel detecting device, an image forming apparatus, and an abnormal-pixel detection method are described in detail with reference to the accompanying drawings.

First Embodiment

FIG. 1 is a diagram illustrating an example of the configuration of an image processing apparatus 100 according to a first embodiment. In FIG. 1, the image processing apparatus 100 acting as an abnormal-pixel detecting device is an image forming apparatus generally called a multifunction peripheral having at least two functions among a copy function, a printer function, a scanner function, and a facsimile function.

The image processing apparatus 100 includes an image reader 101 and an automatic document feeder (ADF) 102. The image processing apparatus 100 further includes an image forming device 103 below the ADF 102 and the image reader 101. In order to describe an internal configuration of the image forming device 103, FIG. 1 illustrates the internal configuration of the image forming device 103 from which an external cover is removed.

The ADF 102 is a document support device that positions a document (target object) with an image to be read to a reading position. The ADF 102 automatically conveys the document placed on a placement table to the reading position. The image reader 101 reads the document fed by the ADF 102 at the predetermined reading position. The image reader 101 has, on a top surface, an exposure glass that is the document support device on which a document is placed, and reads the document on the exposure glass that is at the reading position. Specifically, the image reader 101 is a scanner including a light source, an optical system, and an image sensor such as a charge coupled device (CCD) inside, and reads reflected light of the document, which is illuminated by the light source, by the image sensor through the optical system.

The image forming device 103 prints the image of the document read by the image reader 101. In other words, the image forming device 103 forms an image in accordance with information from the image reader 101. The image forming device 103 includes a manual feed roller pair 104 through which a recording medium is manually inserted and a recording medium supplier 107 that supplies a recording medium. The recording medium supplier 107 includes an assembly that sends out recording media one by one from vertically-aligned input trays 107a. The recording medium thus supplied is sent to a secondary transfer belt 112 via a registration roller pair 108.

A secondary transfer device 114 transfers a toner image from an intermediate transfer belt 113 onto the recording medium conveyed on the secondary transfer belt 112.

The image forming device 103 also includes an optical writing device 109, The image forming device 103 also includes an optical writing device 109, image forming units 105 for different colors, such as yellow (Y), magenta (M), cyan (C) and black (K), employing a tandem system, the intermediate transfer belt 113, and the secondary transfer belt 112. Specifically, in an image forming process, each image forming unit 105 renders a latent image written by the optical writing device 109 visible as a toner image and forms the toner image on the intermediate transfer belt 113.

Specifically, the image forming units 105 for Y, M, C, and K include four photoconductor drums for Y, M, C, and K, respectively, in a rotatable manner. Each of the image forming units 105 includes image forming elements 106 including a charging roller, a developing device, a primary transfer roller, a cleaner unit, and a static eliminator around the photoconductor drum. The image forming elements 106 function around each of the four photoconductors to form a toner image on the corresponding photoconductor and transfer the toner image onto the intermediate transfer belt 113. Specifically, the primary transfer rollers transfer the toner images from the respective photoconductors onto the intermediate transfer belt 113. As a consequence, a composite toner image is formed on the intermediate transfer belt 113.

The intermediate transfer belt 113 is entrained around a drive roller and a driven roller and disposed so as to pass through primary transfer nips between the four photoconductors and the respective primary transfer rollers. The toner image primarily transferred onto the intermediate transfer belt 113 is secondarily transferred onto the recording sheet on the secondary transfer belt 112 by the secondary transfer device 114 as the intermediate transfer belt 113 travels. As the secondary transfer belt 112 rotates, the recording medium is conveyed to a fixing device 110. The fixing device 110 fixes the composite toner image onto the recording medium as a color image. Finally, the recording medium is discharged onto an output tray disposed outside a housing of the image processing apparatus 100. Note that, in a case of duplex printing, a reverse assembly 111 reverses the front and back sides of the recording medium and sends out the reversed recording medium onto the secondary transfer belt 112.

The image forming device 103 is not limited to the one that forms an image by an electrophotographic method as described above, and may be one that forms an image by an inkjet method.

Next, the image reader 101 and the ADF 102 are described.

Figure 2:
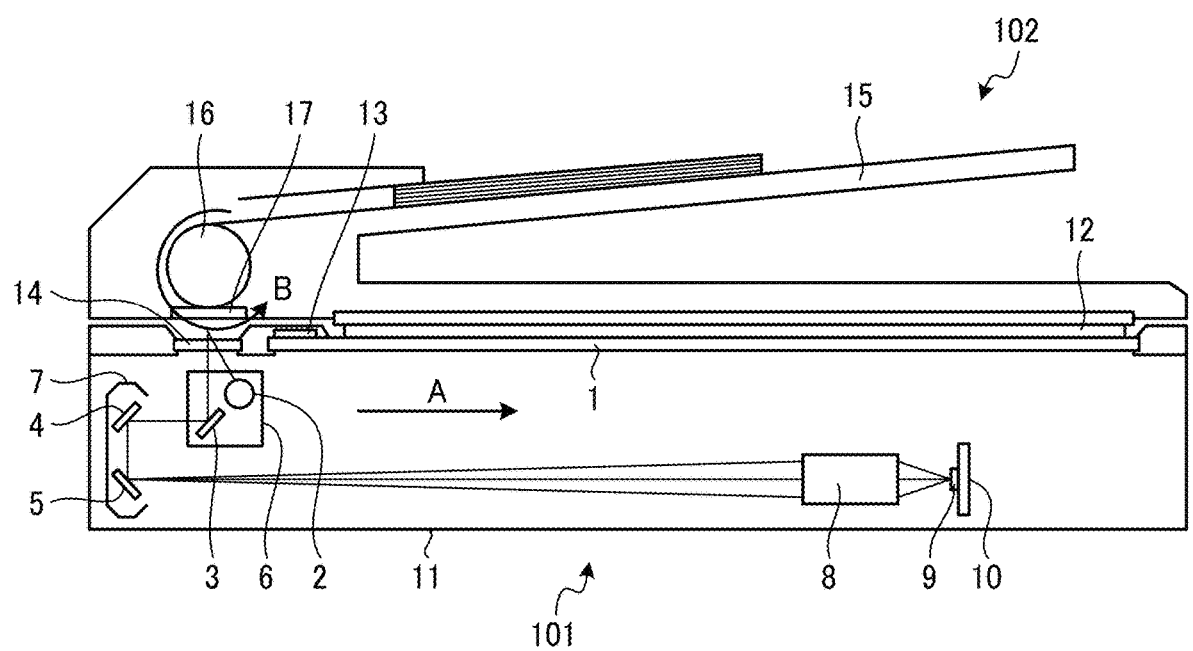
FIG. 2 is a schematic view illustrating the configuration of an image reader and an automatic document feeder (ADF)

FIG. 2 is a schematic view illustrating the configuration of the image reader 101 and the ADF 102. As illustrated in FIG. 2, the image reader 101 includes, in a main body 11, a sensor board 10 provided with an image sensor 9 as an imaging device, a lens unit 8, a first carriage 6, and a second carriage 7. The lens unit 8 forms an image on the image sensor 9. The image sensor 9 is, for example, a CCD or complementary metal oxide semiconductor (CMOS) image sensor. The first carriage 6 includes a light source 2 that is a light emitting diode (LED) and a mirror 3. The second carriage 7 includes mirrors 4 and 5.

The image reader 101 is provided with an exposure glass 1 and a reference member 13 as a reference white plate on the upper surface of the image reader 101. The reference member 13 is used to correct various distortions in a reading optical system or the like. The image reader 101 also includes a sheet-through reading slit 14 to read a document conveyed by the ADF 102.

The ADF 102 is coupled to the image reader 101 via a hinge or the like so as to be opened and closed with respect to the exposure glass 1.

The ADF 102 includes a document tray 15 as a document placing table on which a document bundle including a plurality of documents can be placed. The ADF 102 also includes a separation-and-feeding unit including a feed roller 16 that separates documents one by one from a document bundle placed on the document tray 15 and automatically feeds the documents toward the sheet-through reading slit 14.

The ADF 102 further includes an ADF background plate 17 at a position facing the sheet-through reading slit 14. The ADF background plate 17 is configured to have a uniform density in the main scanning direction.

When the image processing apparatus 100 configured as described above performs a scan mode of scanning an image surface of the document 12 to read an image of the document 12, the image reader 101 irradiates light upward from the light source 2 while moving the first carriage 6 and the second carriage 7 from a standby position (home position) in the sub-scanning direction (a direction indicated by arrow A in FIG. 2). At this time, in order to keep the optical path length from the exposure glass 1 to the image sensor 9 constant, the second carriage 7 moves at a speed of ½ of the first carriage 6. The first carriage 6 and the second carriage 7 form an image of reflected light from the document 12 on the image sensor 9 via the lens unit 8. Then, a signal is output by photoelectric conversion of the image sensor 9 and is converted into a digital signal by the signal processor 25 (see FIG. 3) in the subsequent stage. Thus, the image of the document 12 is read and digital image data is obtained.

On the other hand, in a sheet-through mode of automatically feeding a document to read an image of the document, the image reader 101 moves the first carriage 6 and the second carriage 7 to below the sheet-through reading slit 14. Then, the document placed on the document tray 15 of the ADF 102 is automatically fed in a direction indicated by arrow B (sub-scanning direction) by the feed roller 16, and the image reader 101 irradiates the document with upward light from the light source 2 at the position of the sheet-through reading slit 14. The first carriage 6 and the second carriage 7 focus the reflected light from the document on the image sensor 9 via the lens unit 8. Then, a signal is output by photoelectric conversion of the image sensor 9 and is converted into a digital signal by the signal processor 25 (see FIG. 3) in the subsequent stage. Thus, the image of the document conveyed by the ADF 102 is read and digital image data is obtained. The document whose image has been read in this manner is ejected to an ejection port.

The image reader 101 reads the reflected light from the reference member 13 by the illumination of the light source 2 and sets the reference before image reading in the scan mode or the sheet-through mode is performed when the power is turned on or the like. That is, the image reader 101 moves the first carriage 6 to a position directly below the reference member 13, turns on the light source 2, and forms an image of the reflected light from the reference member 13 on the image sensor 9. The reflected light from the reference member 13 is converted into an analog signal by the image sensor 9 and is converted into a digital signal by the signal processor 25 (see FIG. 3) in the subsequent stage. Thus, the reference member 13 is read, and shading correction in reading the image of the document is performed based on the reading result (digital signal).

In the case in which the ADF 102 includes a conveying belt, the ADF 102 can automatically feed a document to a reading position on the exposure glass 1 to read an image of the document even in the scan mode.

Incidentally, when there is an abnormality such as a foreign substance on an optical path from the reference member 13 to the image sensor 9, adhesion of a foreign substance to the image sensor 9, or a pixel defect of the image sensor 9, a streak may be generated in a read image to deteriorate image quality. Therefore, detection of an abnormal pixel is performed before reading. In order to accurately detect such an abnormal pixel, it is desirable to use a member in which the uniformity of density is ensured.

Hence, in the present embodiment, the first carriage 6 and the second carriage 7 are moved to below the sheet-through reading slit 14 to perform abnormal-pixel detection using the read data of the reference member 13 and the read data of the ADF background plate 17 in which the density in the main scanning direction is uniform to some extent.

Figure 3:
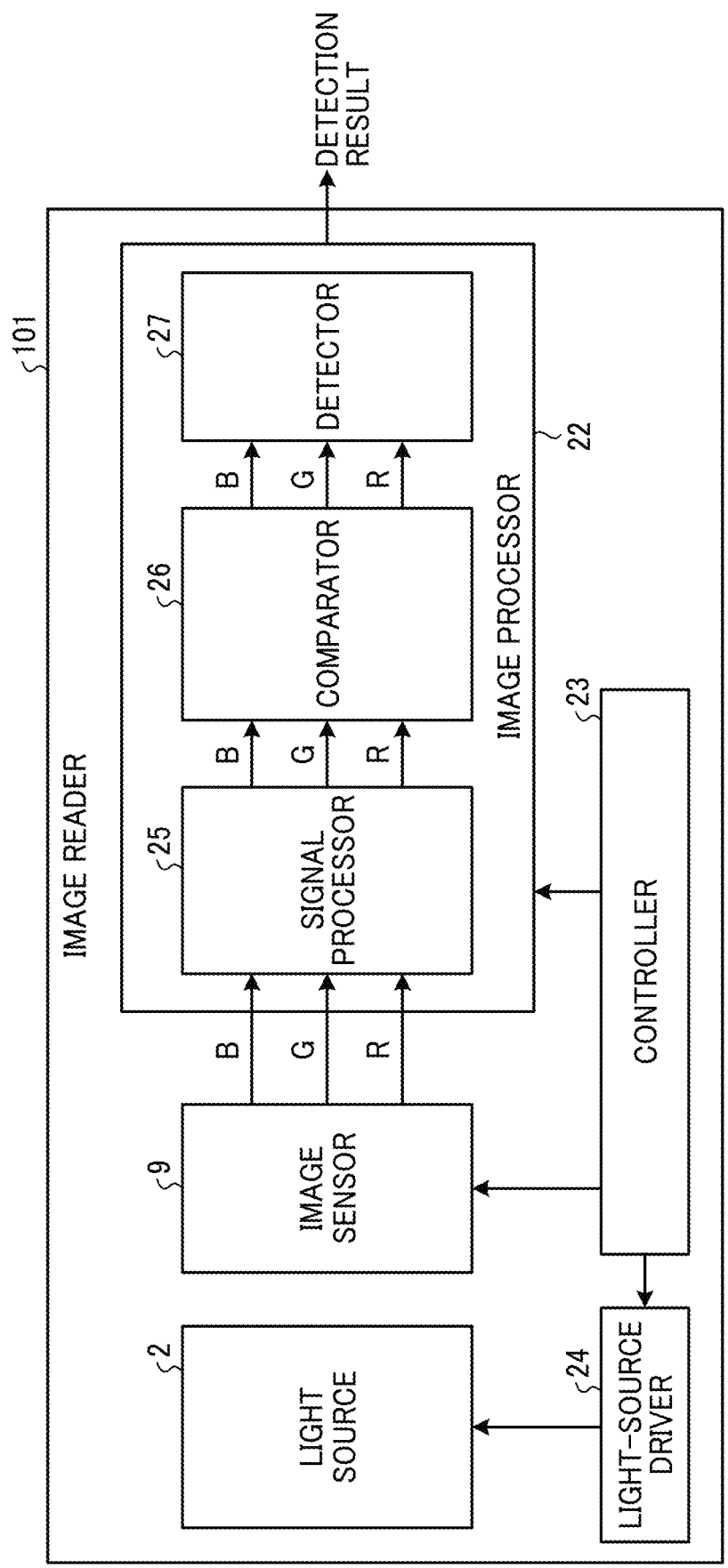
FIG. 3 is a block diagram illustrating electrical connections of components relating to abnormal-pixel detection of the image reader.

FIG. 3 is a block diagram illustrating electrical connections of components relating to abnormal-pixel detection of the image reader 101. As illustrated in FIG. 3, the image reader 101 includes an image processor 22, a controller 23, and a light source driver 24 in addition to the image sensor 9 and the light source 2 described above. The light source driver 24 drives the light source 2.

The controller 23 controls the light source driver 24, the image sensor 9, and the image processor 22.

The image processor 22 includes a signal processor 25, a comparator 26, and a detector 27.

The signal processor 25 performs analog to digital (A/D) conversion and the like.

The comparator 26 compares the read data (ADF background plate data) of the ADF background plate 17 (subject), which is a first plurality of pixel values, with the read data (reference member data) of the reference member 13, which is a second plurality of pixel values and in which the reference position is changed. More specifically, the comparator 26 calculates the ratio between the ADF background plate data and the reference member data, which is obtained by shifting the read data of the reference member 13 by a predetermined number of pixels in the main scanning direction, to compare the ADF background plate data with the reference member data. The comparator 26 also performs the process of shifting the read data of the reference member 13 in the main scanning direction by the predetermined number of pixels.

The detector 27 detects pixels outside a predetermined threshold range in the output data that is a third plurality of pixel values obtained by the comparator 26.

Hereinafter, the abnormal-pixel detection in the comparator 26 and the detector 27 are further described.

Figure 4:
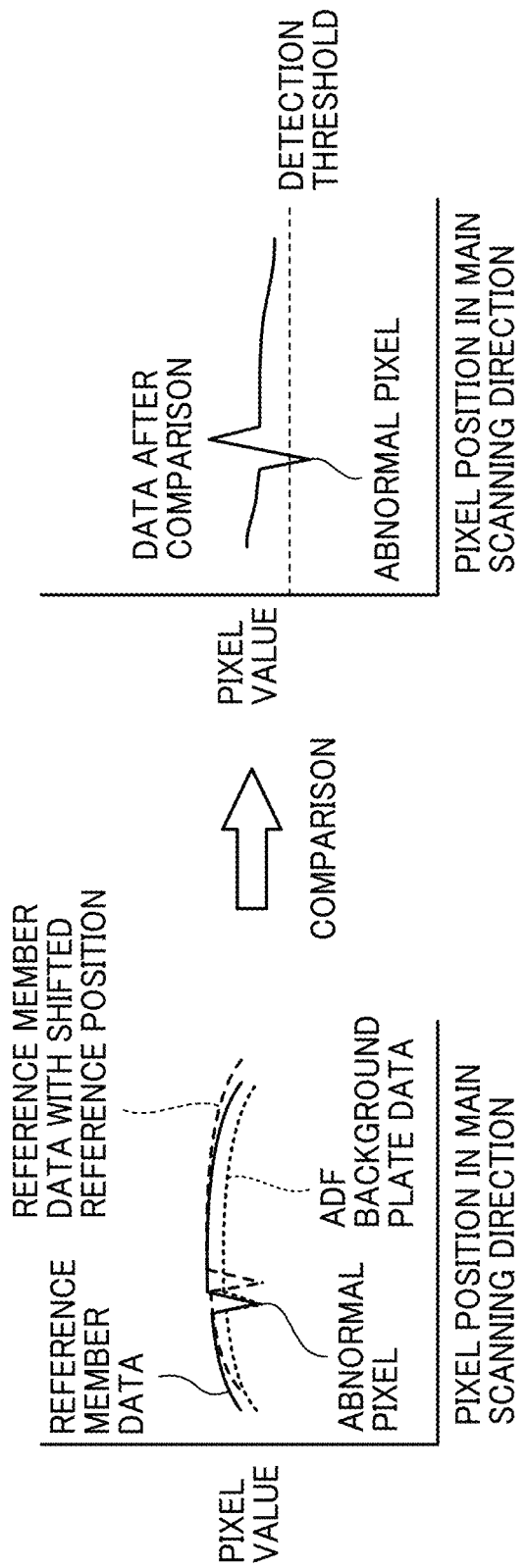
FIG. 4 is a diagram illustrating abnormal-pixel detection in a comparator and a detector.

FIG. 4 is a diagram illustrating abnormal-pixel detection in the comparator 26 and the detector 27. In the present embodiment, two pieces of data having different reference positions in the main scanning direction are used, thus allowing detection of an abnormal pixel in data after shading correction.

As illustrated in FIG. 4, when an abnormality occurs in a pixel value due to adhesion of a foreign substance or the like, a value of read data (reference member data) of the reference member 13 at a pixel position corresponding to a portion where the abnormality occurs is smaller than any value of surrounding pixels (solid line).

On the other hand, the reference member data gently changes in the main scanning direction due to illumination unevenness and sensitivity unevenness of the image sensor 9. As illustrated in FIG. 4, the comparator 26 shifts the reference position of the reference member data in the main scanning direction (larger dashed line).

Further, as illustrated in FIG. 4, the read data (ADF background plate data) of the ADF background plate 17 (subject), which is the first plurality of pixel values, has the same main scanning distribution as the reference member data in which the reference position is not changed (smaller broken line).

The comparator 26 compares the reference member data, of which the reference position has been changed, with the ADF background plate data. Even when there is no abnormality, there appears a difference of a component gently changing in the main scanning direction with a difference of a component sharply changing when there is an abnormality. The component of the sharp change due to the latter abnormality appears at two positions shifted in the main scanning direction by the shift amount of the reference position.

The detector 27 detects, as an abnormal pixel, a pixel outside the range of the predetermined threshold value (that is, a pixel smaller than the predetermined threshold value) in the output data obtained by the comparison.

The detector 27 has a configuration of only comparing each pixel value with a constant value, thus allowing an abnormal pixel to be detected with a simple configuration.

In the present embodiment, a pixel smaller than the predetermined threshold value is determined as an abnormal pixel. However, in some embodiments, a pixel greater than the predetermined threshold value may be determined as an abnormal pixel.

However, even if the pixel value differences are the same in the data before the shading correction, the shading correction may change the weight and cause the pixel value differences to be different in the data after the shading correction. This is because the shading correction is performed by division. Therefore, the data after comparison needs to be data after shading correction. The reason why the abnormal-pixel detection is performed with the data corresponding to the data after the shading correction is to determine the abnormal pixel with an appropriate threshold based on the degree of influence in the data after the shading correction. Therefore, the comparison in the comparator 26 is achieved by obtaining the ratio of two pieces of data as in the calculation performed in the shading correction. The comparator 26 performs a calculation for obtaining the ratio, thereby approximately uniformizing the component of the pixel value that gradually changes in the main scanning direction. Accordingly, the pixel value variation in the main scanning direction is minimized, and erroneous detection in detecting an abnormal pixel is prevented.

On the other hand, the comparator 26 does not uniformize a component that sharply changes due to an abnormality such as adhesion of a foreign substance even if the comparator 26 performs the comparison on the component. Therefore, the detector 27 can detect an abnormality based on the component that sharply changes.

FIG. 4 illustrates the case where a pixel abnormality corresponding to a density higher than the density of the reference member 13 occurs. However, the abnormality detection can be similarly performed even when the pixel abnormality corresponding to a density lower than the density of the reference member 13 occurs.

According to the present embodiment, the abnormality is detected by the threshold value in consideration of the degree of influence in the data after the shading correction, thus allowing the accuracy of the abnormality detection to be enhanced.

Next, the flow of the foreign substance detection process is described.

Figure 5:
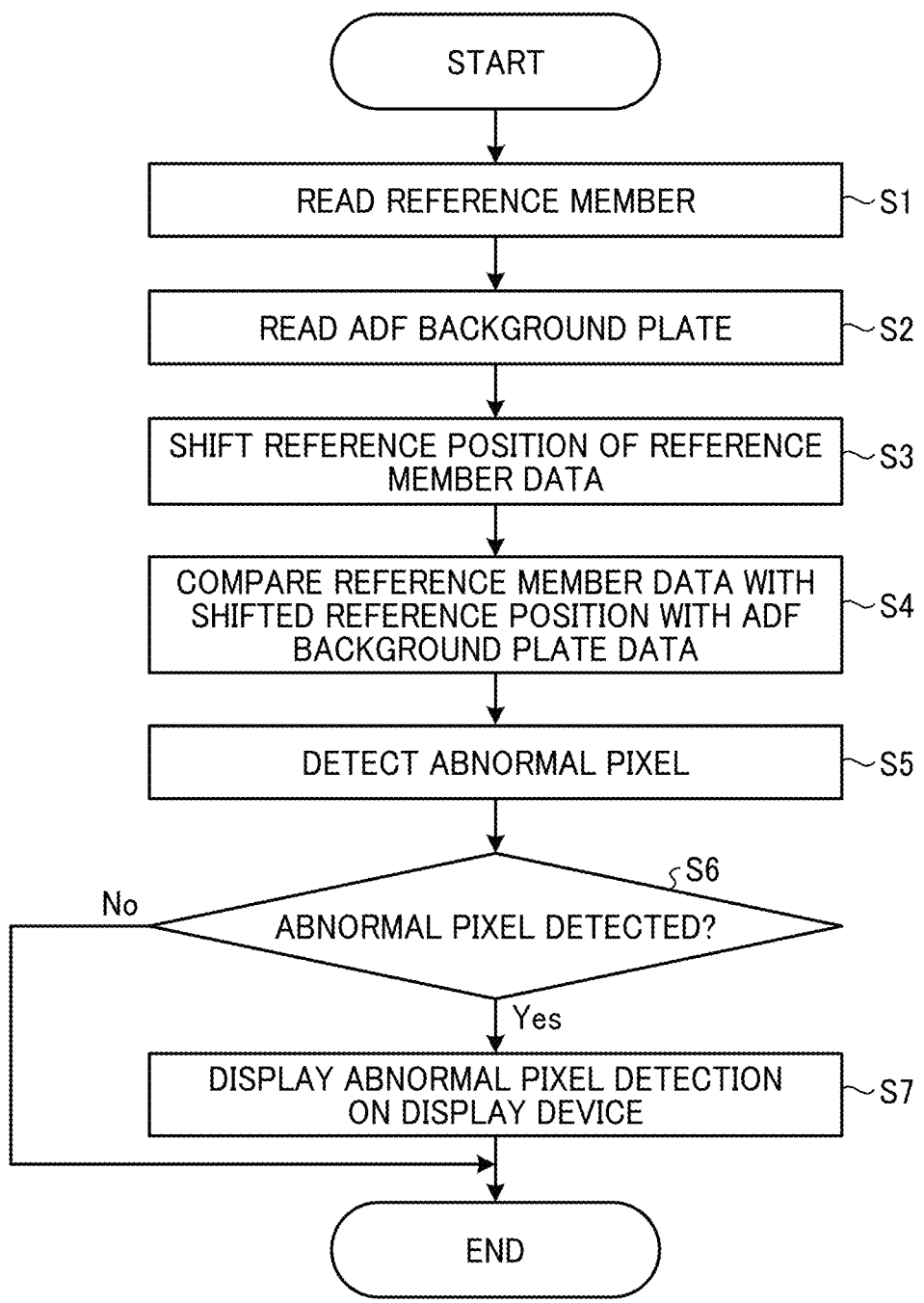
FIG. 5 is a flowchart schematically illustrating the flow of a foreign substance detection process.

FIG. 5 is a flowchart schematically illustrating the flow of the foreign substance detection process. As illustrated in FIG. 5, the controller 23 reads the reference member 13 and holds read data (reference member data) of the reference member 13 (step S1).

Next, the controller 23 reads the ADF background plate 17 and holds the read data of the ADF background plate 17 (ADF background plate data) (step S2).

Next, the comparator 26 shifts the read timing of the memory to shift the reference position of the reference member data in the main scanning direction (step S3) and compares the reference member data, of which the reference position has been changed, with the ADF background plate data (step S4).

Next, the detector 27 detects an abnormal pixel in the output data of the comparator 26 (step S5).

Then, when an abnormal pixel is detected by the detector 27 (Yes in step S6), the controller 23 displays the detection of the abnormal pixel on a display device (step S7). That is, the controller 23 functions as a display controller. An example of a display indicating that the abnormal pixel is detected is a display of "Please wipe" or the like exemplified as a countermeasure, such as replacement of components or cleaning, for eliminating the abnormality. If no abnormal pixel is detected by the detector 27 (No in step S6), the controller 23 ends the process.

Such a configuration allows the user to confirm the presence or absence of an abnormality such as adhesion of a foreign substance, and take measures for eliminating the abnormality, such as replacement of components or cleaning.

As described above, according to the present embodiment, the ADF background plate data is compared with the reference member data obtained by shifting the read data of the reference member 13 by a predetermined number of pixels in the main scanning direction, and pixels outside the range of a predetermined threshold value (in other words, pixels smaller than the predetermined threshold value) are detected as abnormal pixels in the output data obtained by the comparison. Calculating the ratio of two pieces of data in this manner can substantially uniformize the components of the pixel values that change gradually in the main scanning direction due to, e.g., illumination unevenness and sensitivity unevenness of the image sensor 9 to reduce the influence of shading correction. A sharp change due to an abnormality such as adhesion of a foreign substance can be detected as a non-target of shading correction. An abnormal pixel such as adhesion of a foreign substance is detected based on a pixel value level after shading correction, thus allowing such an abnormal pixel due to a foreign substance or the like to be detected with high accuracy.

For example, performing the above-described abnormal-pixel detection at the time of power-on allows checking an abnormality in initial states of an optical path to the reference member 13 and each unit of the image reader 101 including the image sensor 9. Detecting the presence or absence of an abnormality in each of the units at an early stage before reading a document image can take measures such as replacement of components or cleaning with a reduced downtime even if there occurs an abnormality.

Further, when the space inside the image processing apparatus 100 is opened and comes into contact with the space outside the image processing apparatus 100, there is a possibility that a foreign substance may be mixed. Hence, when the space in the image processing apparatus 100 is opened, the abnormal-pixel detection can be performed, thus allowing checking whether there is a foreign substance that may be mixed due to the opening of the space.

Further, the abnormal-pixel detection can be performed immediately before the reading operation of the document, thus allowing detection of the presence or absence of a foreign substance accumulated by a continuous operation or a defect of the image sensor 9 or the like generated by the continuous operation.

Furthermore, the abnormal-pixel detection can be performed after the end of the document reading operation, thus allowing detection of the presence or absence of a foreign substance accumulated by a continuous operation or a defect of the image sensor 9 or the like caused by the continuous operation.

Second Embodiment

Next, a second embodiment is described.

The second embodiment is different from the first embodiment in that abnormality detection is performed using reference member data obtained by reading the same reference member 13. In the first embodiment, the example has been described above in which the reference member data whose reference position has been changed is compared with the ADF background plate data. However, an abnormal pixel may be detected using the reference member data obtained by reading the same reference member 13. In the following description of the second embodiment, a redundant description of features identical to the features of the first embodiment is omitted, and a description is now given of features of the second embodiment different from the features of the first embodiment.

Figure 6:
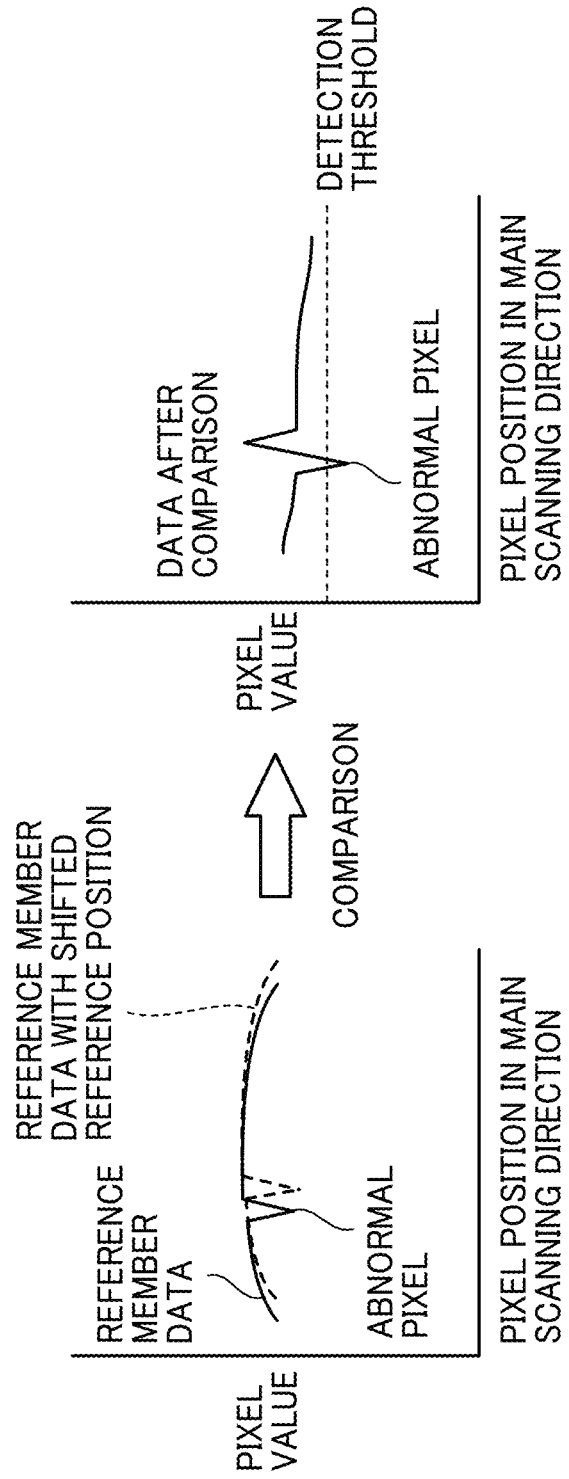
FIG. 6 is a diagram illustrating abnormal-pixel detection in the comparator and the detector according to a second embodiment of the present disclosure.

FIG. 6 is a diagram illustrating abnormal-pixel detection in the comparator 26 and the detector 27 according to the second embodiment. In the present embodiment, using reference member data obtained by reading the same reference member 13 allows detection of an abnormal pixel in data after shading correction.

FIG. 6 illustrates pixel values in the case where abnormal-pixel detection is performed using the same reference member data. As illustrated in FIG. 6, in the present embodiment, read data (reference member data) of the reference member 13 and reference member data obtained by changing the reference position of the reference member data are used.

The comparator 26 of the present embodiment compares the read data (reference member data) of the reference member 13 with the reference member data obtained by changing the reference position of the reference member data. As illustrated in FIG. 6, pixel values similar to the pixel values illustrated in FIG. 4 can be obtained as the pixel values after the comparison although the data used are different.

Next, the flow of the foreign substance detection process is described.

Figure 7:
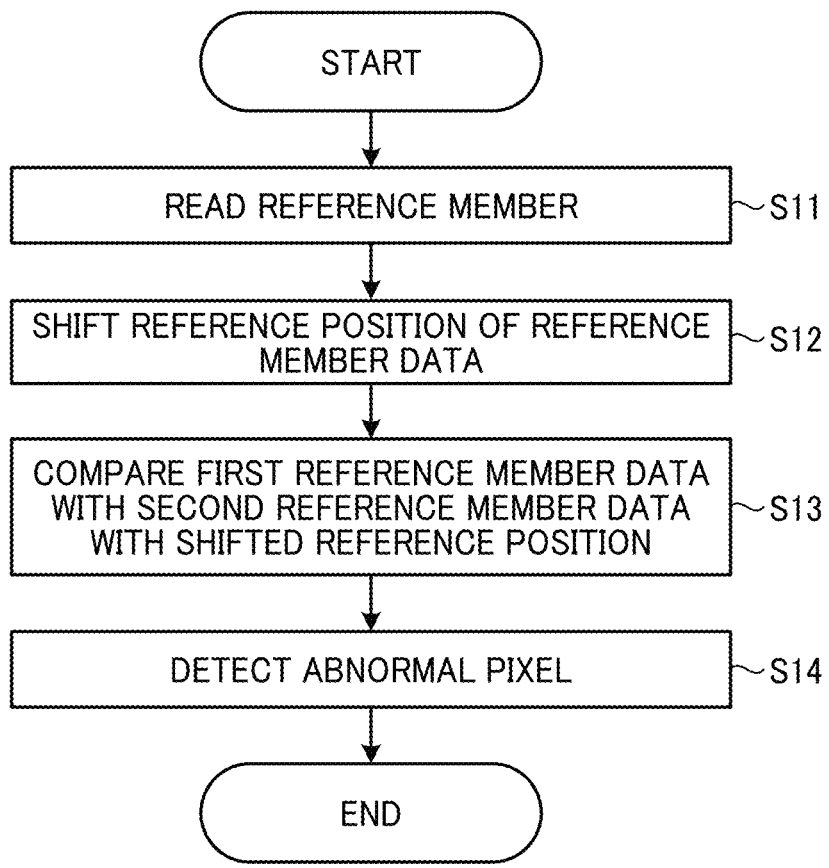
FIG. 7 is a flowchart schematically illustrating the flow of a foreign substance detection process.

FIG. 7 is a flowchart schematically illustrating the flow of the foreign substance detection process. As illustrated in FIG. 7, the controller 23 reads the reference member 13 and holds read data (first reference member data) of the reference member 13, which is a first plurality of pixel values (step S11).

Next, the comparator 26 shifts the read timing of the memory to shift the reference position of the first reference member data in the main scanning direction to generate the second reference member data as the second plurality of pixel values (step S12) and compares the first reference member data with the second reference member data whose reference position has been changed (step S13).

Next, the detector 27 detects an abnormal pixel in the output data that is the third plurality of pixel values obtained by the comparator 26 (step S14).

As described above, according to the present embodiment, the abnormal-pixel detection can be performed only by the one reference member 13, thus providing an effect that the abnormal-pixel detection can be performed with high accuracy even in a device capable of physically reading only the one reference member 13.

Since the first reference member data and the second reference member data are the same except for the reference position, the first reference member data and the second reference member data may be acquired by reading the reference member 13 once as described above or may be acquired by reading the reference member 13 twice.

Here, a description is given of a problem in a case where the reference position is excessively shifted.

Figure 8:
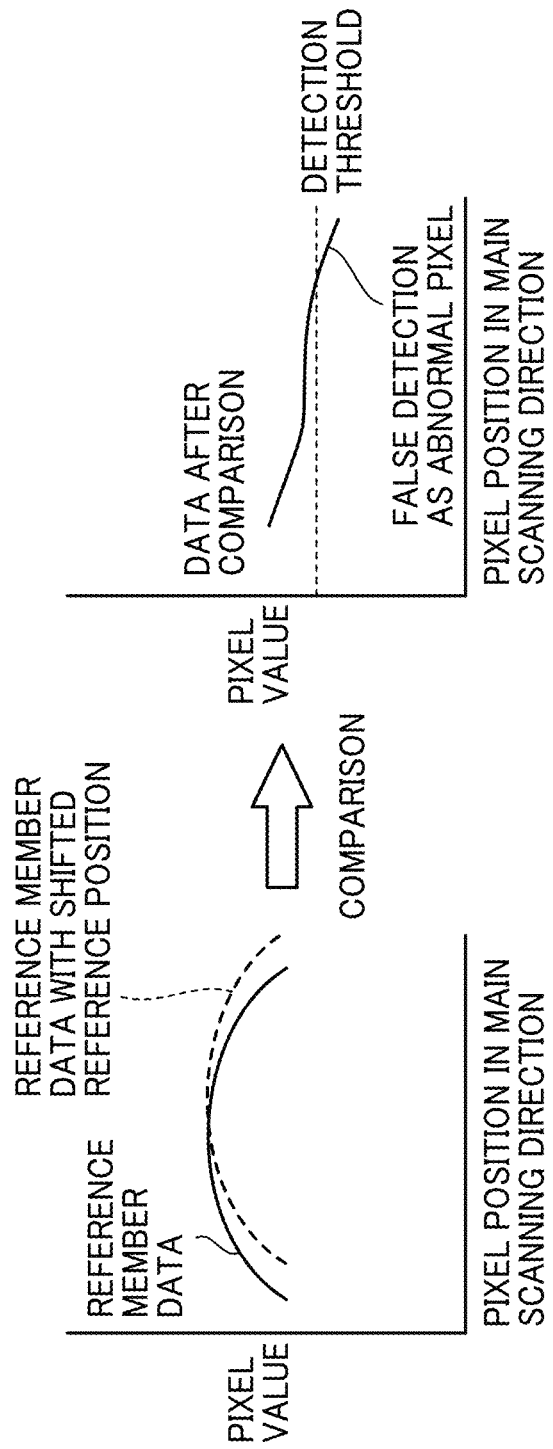
FIG. 8 is a diagram illustrating a problem in a case where a reference position is excessively shifted.

FIG. 8 is a diagram illustrating a problem in the case where the reference position is excessively shifted. As illustrated in FIG. 8, even if there is no abnormality such as adhesion of foreign substance, the main scanning deviation of the pixel value in the reference member data may induce erroneous detection when the reference position is excessively shifted.

The main scanning deviation is caused by a change in pixel value in the main scanning direction due to illumination unevenness or sensitivity unevenness of the image sensor 9, although the change in pixel value is more gentle than a change in pixel value of an abnormal pixel due to adhesion of a foreign substance or the like. If the reference position is excessively shifted, the difference due to the gentle change in pixel value may exceed the threshold value in the detector 27.

Therefore, a shift amount that does not exceed the detection threshold value may be calculated based on the main scanning deviation of the reference member data, and the comparator 26 may set the calculated value as the maximum value of the shift amount of the reference position to prevent erroneous detection.

In FIG. 8, the two pieces of read data at the time of performing the abnormality detection are data obtained by reading the same reference member 13. However, as described in the first embodiment, read data of a subject different from the reference member 13 such as the ADF background plate 17 may be used.

Next, a description is given of a problem in the case where the shift amount of the reference position is small.

Figure 9:
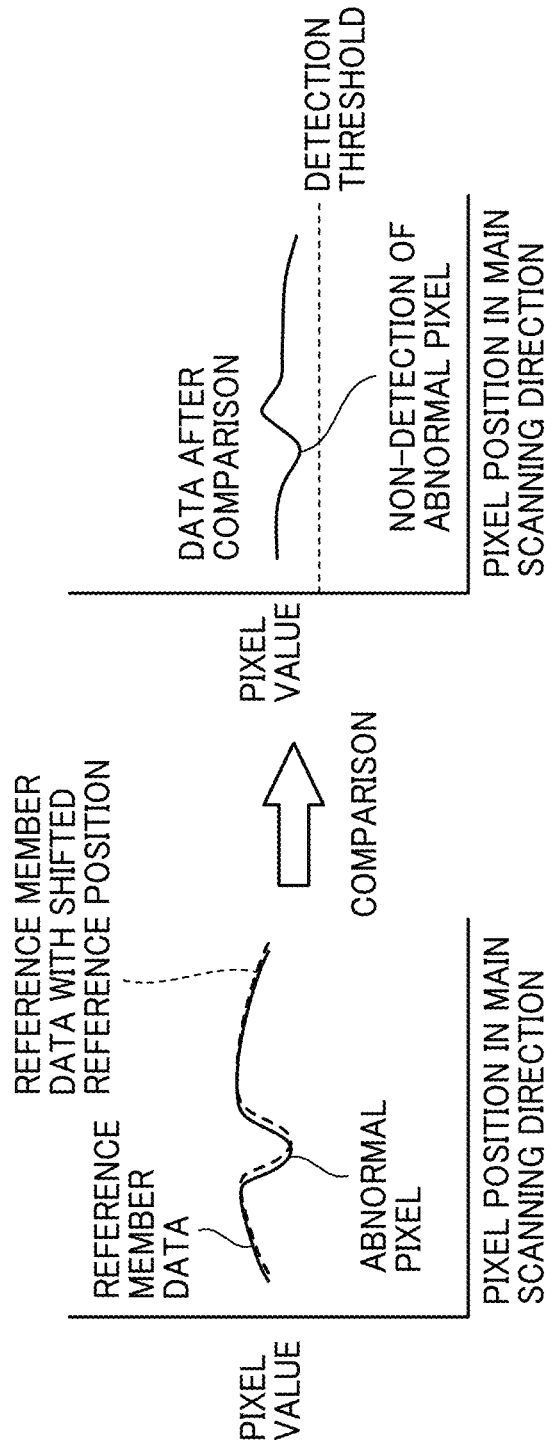
FIG. 9 is a diagram illustrating a problem in a case where the shift amount of the reference position is small.

FIG. 9 is a diagram illustrating a problem in the case where the shift amount of the reference position is small. As illustrated in FIG. 9, when the shift amount of the reference position is small, an abnormality having a large pixel width in the main scanning direction, such as a case where a large foreign substance is attached, might not be detected.

When the shift amount is small, the change in pixel value of the post-comparison data becomes smaller than an original change in pixel value due to adhesion of a foreign substance or the like and may not exceed the detection threshold value of the detector 27, thus hampering appropriate detection of the pixel value change.

Hence, the shift amount may be calculated based on the size of the abnormal pixel to be detected, and the comparator 26 may set the calculated value as the minimum value of the shift amount to detect an abnormality of a desired size.

In FIG. 9, the two pieces of read data in performing the abnormality detection are data obtained by reading the same reference member 13. However, as described in the first embodiment, read data of a subject different from the reference member 13 such as the ADF background plate 17 may be used.

Third Embodiment

Next, a third embodiment is described.

The third embodiment is different from the first and second embodiments in that the detector 27 calculates a change amount of a pixel value from surrounding pixels and detects a pixel whose change amount exceeds a predetermined threshold as an abnormal pixel. In the following description of the third embodiment, a redundant description of features identical to the features of the first and second embodiments is omitted, and a description is now given of features of the third embodiment different from the features of the first and second embodiments.

Figure 10:
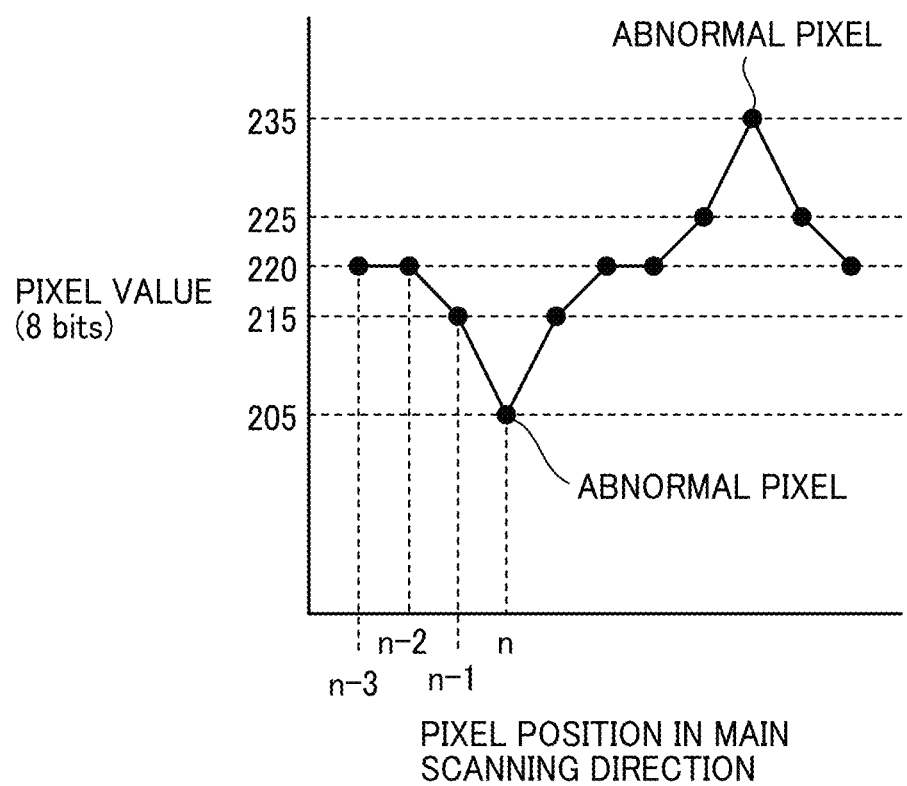
FIG. 10 is a diagram illustrating abnormal-pixel detection in the detector according to a third embodiment of the present disclosure.

FIG. 10 is a diagram illustrating abnormal-pixel detection in the detector 27 according to the third embodiment. As illustrated in FIG. 10, in the present embodiment, an example is illustrated in which the detector 27 calculates a change amount of a pixel value from surrounding pixels and detects a pixel whose change amount exceeds a predetermined threshold value as an abnormal pixel.

The detector 27 of the present embodiment determines that the pixel is an abnormal pixel when the difference between the data value one pixel before the pixel and the data value two pixels before the pixel is 7 or more.

In the example illustrated in FIG. 10, the nth pixel is determined as an abnormal pixel because the difference from the (n−2)th pixel is 15 values and the difference from the (n−1)th pixel is 10 values, which satisfy the condition.

On the other hand, the (n−1)th pixel is not determined as an abnormal pixel because the difference from the (n−3)th pixel is 5 values and the difference from the (n−2)th pixel is values, which do not satisfy the condition.

As described above, according to the present embodiment, only a sharp pixel value change due to an abnormality can be detected without detecting a gentle pixel value change in the main scanning direction, thus allowing enhancement of the detection accuracy.

Fourth Embodiment

Next, a fourth embodiment is described.

The fourth embodiment is different from the first to third embodiments in that the comparator 26 is configured by a shading corrector 28. In the following description of the fourth embodiment, a redundant description of the features identical to features of the first to third embodiments is omitted and a description is now given of features of the fourth embodiment different from the features of the first to third embodiments.

Figure 11:
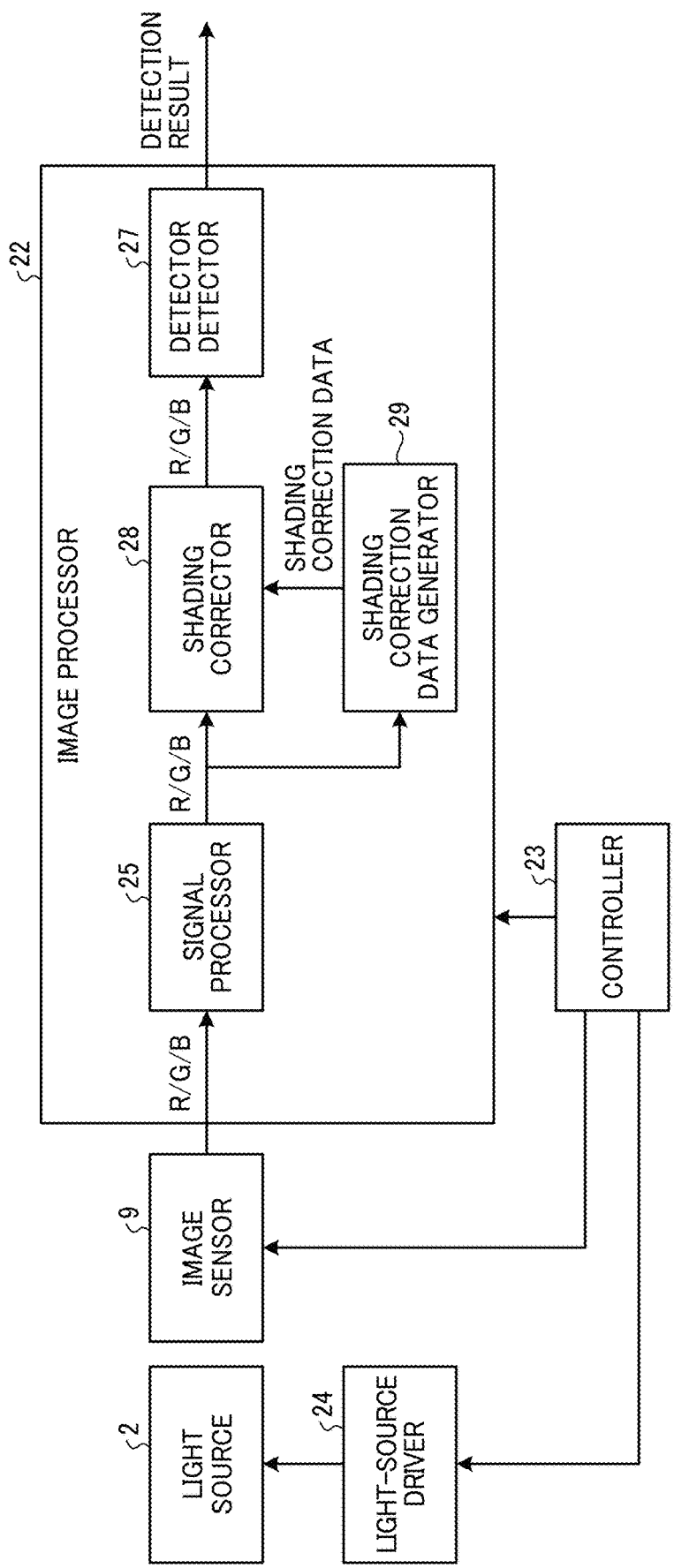
FIG. 11 is a block diagram illustrating electrical connections of units relating to abnormal-pixel detection of an image reader according to a fourth embodiment of the present disclosure.

FIG. 11 is a block diagram of a configuration related to abnormal-pixel detection according to the fourth embodiment. As illustrated in FIG. 11, the image processor 22 includes the signal processor 25, the shading corrector 28, a shading correction data generator 29, and the detector 27.

The shading correction data generator 29 generates shading correction data.

The shading corrector 28 obtains a ratio between the shading correction data and the read image to perform shading correction. Therefore, the shading corrector 28 plays the same role as the comparator 26 illustrated in FIG. 3.

Using the shading corrector 28 in this manner obviates the addition of a new configuration as the comparator 26 to an existing image processing apparatus, thus providing an effect of simplifying the configuration.

Next, the flow of the foreign substance detection process is described.

Figure 12:
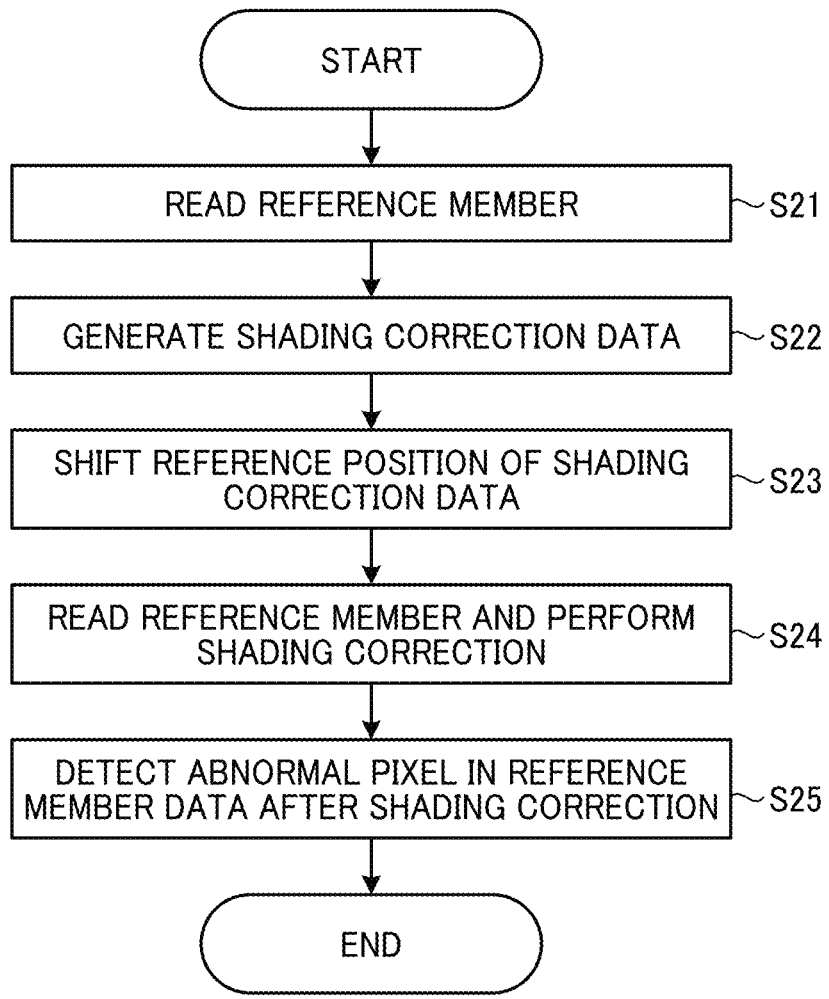
FIG. 12 is a flowchart schematically illustrating the flow of a foreign substance detection process.

FIG. 12 is a flowchart schematically illustrating the flow of the foreign substance detection process. As illustrated in FIG. 12, the controller 23 reads the reference member 13 and holds read data (reference member data) of the reference member 13 (step S21).

The shading correction data generator 29 generates shading correction data based on the reference member data (step S22).

The shading corrector 28 shifts the read timing of the memory to shift the reference position of the shading correction data in the main scanning direction (step S23) and performs shading correction using the shading correction data whose reference position has been changed (step S24).

The detector 27 detects an abnormal pixel in the reference member data after the shading correction (step S25).

As described above, according to the present embodiment, using the shading corrector 28 as the comparator allows the existing configuration to be used, thus simplifying the configuration.

Note that, in the present embodiment, the same reference member 13 as the reference member 13 that has generated the shading correction data is used as a subject in performing the abnormal-pixel detection. However, a different subject such as the ADF background plate 17 may be used as described in the first embodiment.

Fifth Embodiment

Next, a fifth embodiment will be described.

The fifth embodiment is different from the first to fourth embodiments in that the reference position is bidirectionally changed. In the following description of the fifth embodiment, a redundant description of features identical to the features of the first to fourth embodiments is omitted, and a description is now given of features of the fifth embodiment different from the features of the first to fourth embodiments.

Figure 13:
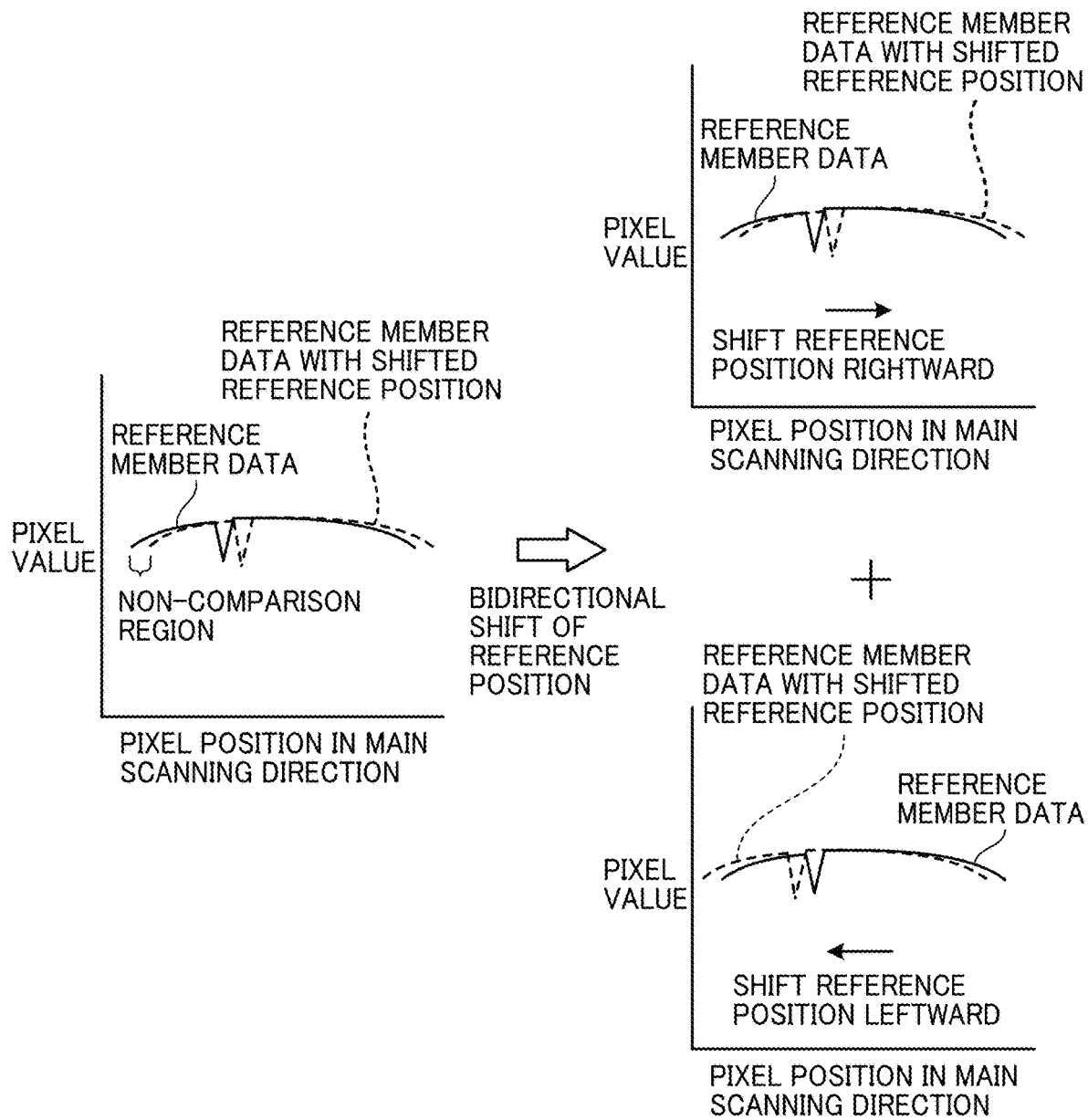
FIG. 13 is a diagram illustrating abnormal-pixel detection in the comparator and the detector according to a fifth embodiment of the present disclosure.

FIG. 13 is a diagram illustrating abnormal-pixel detection in the comparator 26 and the detector 27 according to the fifth embodiment. The number of pixels in the main scanning direction of the reference member data is constant. Accordingly, in the reference member data in which the reference position has been changed, pixels at end portions are missing by the number of pixels in which the reference position is shifted (in other words, the pixel values become zero). For example, as illustrated in FIG. 13, if the reference position is shifted to the right with respect to the original reference member data, a region not including the reference member data whose reference position has been changed is generated at the left end portion. Therefore, in the region, the two pieces of data are not compared and the abnormal pixel are not detected. Hence, the comparator 26 of the present embodiment bidirectionally changes the reference position.

First, the comparator 26 shifts the reference position in the right direction to compare two pieces of data in pixels other than the left end portion. Then, the detector 27 performs abnormal-pixel detection.

Next, the comparator 26 shifts the reference position in the left direction to compare two pieces of data in pixels other than the right end portion. Then, the detector 27 performs abnormal-pixel detection.

The detector 27 adds both the abnormal-pixel detection results to detect an abnormal pixel even in pixels at both end portions, thus allowing detection of an abnormal pixel in the entire region in the main scanning direction.

In FIG. 13, the two pieces of read data in performing the abnormal-pixel detection are data obtained by reading the same reference member 13. However, as described in the first embodiment, read data of a subject different from the reference member 13 such as the ADF background plate 17 may be used.

Next, the flow of the foreign substance detection process is described.

Figure 14:
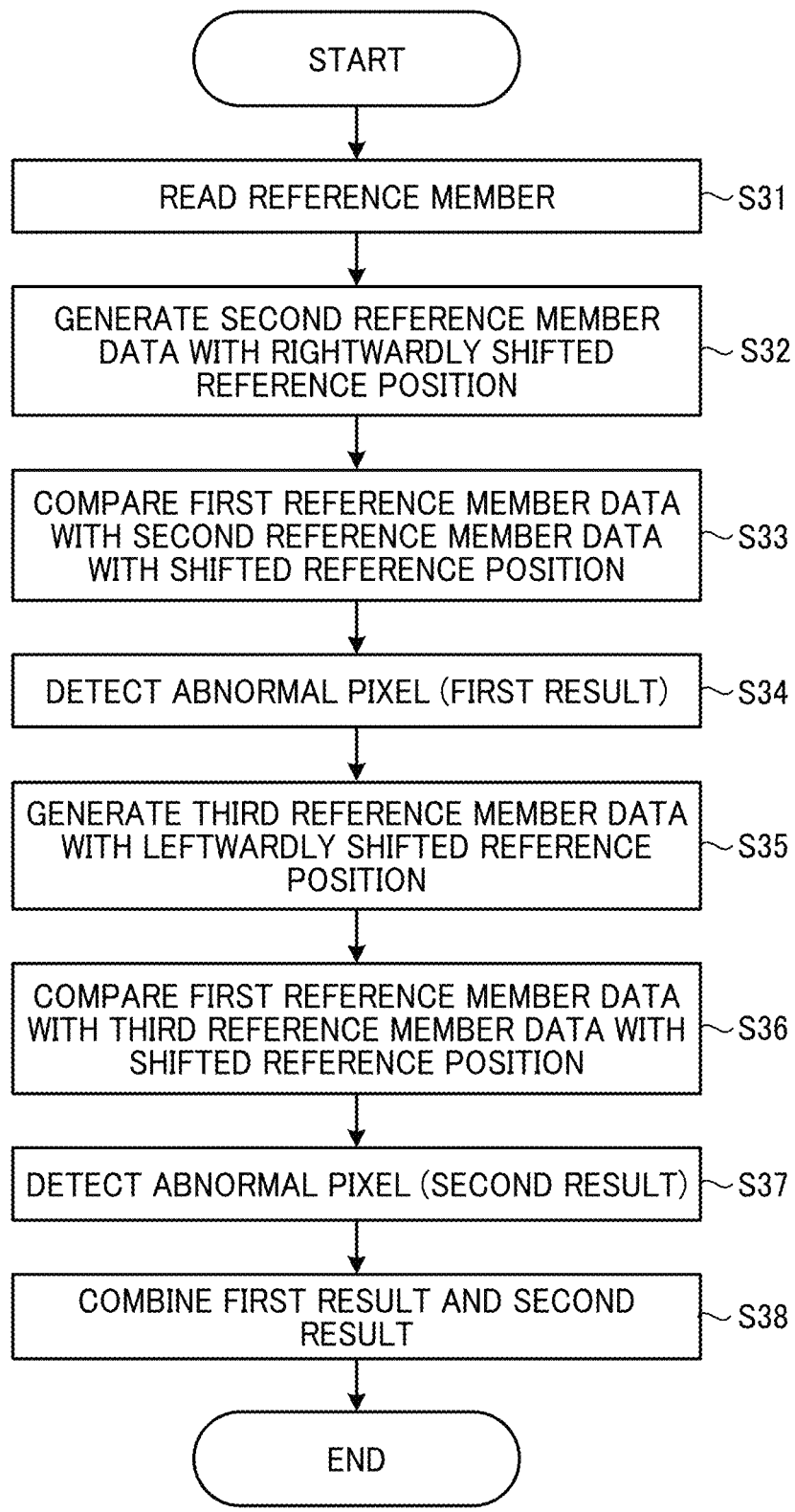
FIG. 14 is a flowchart schematically illustrating the flow of a foreign substance detection process.

FIG. 14 is a flowchart schematically illustrating the flow of the foreign substance detection process. As illustrated in FIG. 14, the controller 23 reads the reference member 13 and holds read data (first reference member data) of the reference member 13 (step S31).

Next, the comparator 26 shifts the read timing of the memory to shift the reference position of the first reference member data rightward in the main scanning direction to generate the second reference member data (step S32) and compares the first reference member data with the second reference member data whose reference position has been changed (step S33).

Next, the detector 27 detects and holds an abnormal pixel in the output data of the comparator 26 as a first result (step S34).

Next, the comparator 26 shifts the read timing of the memory to shift the reference position of the first reference member data leftward in the main scanning direction to generate the third reference member data (step S35) and compares the first reference member data with the third reference member data whose reference position has been changed (step S36).

Next, the detector 27 detects and holds an abnormal pixel in the output data of the comparator 26 as a second result (step S37).

The detector 27 adds the first result and the second result to obtain a detection result of the entire region in the main scanning direction (step S38).

As described above, according to the present embodiment, abnormal pixels in both end regions can be detected.

In the present embodiment, the example has been described in which the reference member 13 is read only once. However, embodiments of the present disclosure are not limited to the example. For example, the reference member 13 may be read each time the first result and the second result are obtained.

Sixth Embodiment

Next, a sixth embodiment is described.

The sixth embodiment is different from the first to fifth embodiments in that a pixel corrector 30 is further provided. In the following description of the sixth embodiment, a redundant description of features identical to the features of the first to fifth embodiments is omitted, and a description is now given of features of the sixth embodiment different from the features of the first to fifth embodiments.

FIG. 15 is a block diagram of a configuration related to abnormal-pixel detection according to the sixth embodiment. As illustrated in FIG. 15, the image processor 22 includes the pixel corrector 30 in addition to the signal processor 25, the comparator 26, and the detector 27.

The detector 27 stores the pixel position at which the abnormal pixel occurs.

The pixel corrector 30 interpolates the abnormal-pixel detected by the detector 27, based on surrounding pixel data.

The pixel corrector 30 specifies an abnormal pixel by using the pixel position of occurrence of the abnormal pixel stored in the detector 27 during reading of a document and obtains a pixel value by interpolation from surrounding pixels. Hereinafter, the abnormal-pixel correction by the pixel corrector 30 is described in detail.

FIGS. 16A and 16B are conceptual diagrams illustrating abnormal-pixel correction. FIGS. 16A and 16B illustrate image data before and after abnormal-pixel correction. In the state before the abnormal-pixel correction illustrated in FIG. 16A, the pixel value of a pixel determined as an abnormal pixel by the detector 27 due to the influence of an abnormality such as adhesion of a foreign substance is lower than the pixel value of any surrounding pixel.

Therefore, as illustrated in FIG. 16B, the pixel corrector 30 calculates a data value of the pixel determined as the abnormal pixel by linear interpolation with reference to surrounding pixels.

As described above, according to the present embodiment, even when there is an abnormality such as adhesion of a foreign substance, vertical streaks generated in an image obtained by reading a document can be removed.

In the above embodiments of the present disclosure, the examples have been described in which the abnormal-pixel detecting device is applied to a multi-function peripheral that is an image forming apparatus having at least two functions among a copying function, a printer function, a scanner function, and a facsimile function. However, the abnormal-pixel detecting device according to embodiments of the present disclosure can be applied to any image forming apparatus such as a copier, a printer, a scanner, and a facsimile machine.

The abnormal-pixel detecting device according to embodiments of the present disclosure can also be applied to an image inspection apparatus that reads output paper generated by an image forming apparatus such as a printer to perform various inspections (color calibration, position detection, etc.).

The above-described embodiments are illustrative and do not limit the present disclosure. In addition, the embodiments and modifications or variations thereof are included in the scope and the gist of the invention, and are included in the invention described in the claims and the equivalent scopes thereof. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An abnormal-pixel detecting device comprising:
an image sensor configured to capture an image of a subject; and
an image processor configured to:
calculate a ratio between a first plurality of pixel values captured by the image sensor and a second plurality of pixel values whose reference position is shifted relative to the first plurality of pixel values in a first direction to obtain a third plurality of pixel values; and
detect an abnormal pixel in the third plurality of pixel values,
wherein the first direction is a direction of change in pixel values that exist in the first plurality of pixel values and the second plurality of pixel values even when no abnormal pixel value is in the first plurality of pixel values and the second plurality of pixel values.

2. The abnormal-pixel detecting device according to claim 1,
wherein the image sensor is configured to read an image of an identical subject to obtain the first plurality of pixel values and the second plurality of pixel values.

3. The abnormal-pixel detecting device according to claim 1,
wherein the image processor is configured to detect, as an abnormal pixel, a pixel having a pixel value outside a threshold range.

4. The abnormal-pixel detecting device according to claim 1, wherein the image processor is configured to detect, as an abnormal pixel, a pixel having a pixel value that has changed by a threshold value or greater with respect to a pixel value of a surrounding pixel.

5. The abnormal-pixel detecting device according to claim 1,
wherein the image processor is configured to set a shift amount of the reference position of the second plurality of pixel values relative to the first plurality of pixel values in the first direction so that the third plurality of pixel values is within a threshold range when there is no abnormality.

6. The abnormal-pixel detecting device according to claim 1,
wherein the image processor is configured to set a shift amount of the reference position of the second plurality of pixel values relative to the first plurality of pixel values in the first direction, to be larger than a pixel width detected by the image processor.

7. The abnormal-pixel detecting device according to claim 1,
wherein the image processor is configured to perform shading correction.

8. The abnormal-pixel detecting device according to claim 1,
wherein the image processor is configured to bidirectionally shift the reference position of the second plurality of pixel values relative to the first plurality of pixel values in the first direction and perform each of calculation of the ratio and detection of the abnormal pixel two times.

9. The abnormal-pixel detecting device according to claim 1,
wherein capture of the image of the subject by the image sensor and calculation of the ratio and detection of the abnormal pixel by the image processor are configured to be performed immediately after the abnormal-pixel detecting device is powered on.

10. The abnormal-pixel detecting device according to claim 1,
wherein capture of the image of the subject by the image sensor and calculation of the ratio and detection of the abnormal pixel by the image processor are configured to be performed when a space in the abnormal-pixel detecting device is opened.

11. The abnormal-pixel detecting device according to claim 1,
wherein capture of the image of the subject by the image sensor and calculation of the ratio and detection of the abnormal pixel by the image processor are configured to be performed immediately before a reading operation of an object.

12. The abnormal-pixel detecting device according to claim 1,
wherein capture of the image of the subject by the image sensor and calculation of the ratio and detection of the abnormal pixel by the image processor are configured to be performed after a reading operation of an object.

13. The abnormal-pixel detecting device according to claim 1, further comprising a display controller configured to display a result detected by the image processor.

14. The abnormal-pixel detecting device according to claim 1,
wherein the image processor is configured to calculate and correct a pixel value of the abnormal pixel detected, from pixel values of surrounding pixels.

15. An image forming apparatus comprising:
an image forming device; and
the abnormal-pixel detecting device according to claim 1.

16. A method of detecting an abnormal pixel in an abnormal-pixel detecting device including an image sensor to capture an image of a subject, the method comprising:
calculating a ratio between a first plurality of pixel values captured by the image sensor and a second plurality of pixel values whose reference position is shifted relative to the first plurality of pixel values in a first direction to obtain a third plurality of pixel values; and
detecting an abnormal pixel in the third plurality of pixel values,
wherein the first direction is a direction of change in pixel values that exist in the first plurality of pixel values and the second plurality of pixel values even when no abnormal pixel value is in the first plurality of pixel values and the second plurality of pixel values.

17. An abnormal-pixel detecting device comprising:
an image sensor configured to capture an image of a subject; and
an image processor configured to:
calculate a ratio between a first plurality of pixel values captured by the image sensor and a second plurality of pixel values whose reference position is shifted relative to the first plurality of pixel values in a main scanning direction to obtain a third plurality of pixel values; and
detect an abnormal pixel in the third plurality of pixel values,
wherein the image processor is configured to set a shift amount of the reference position of the second plurality of pixel values relative to the first plurality of pixel values in the main scanning direction so that the third plurality of pixel values is within a threshold range when there is no abnormality.

18. An abnormal-pixel detecting device comprising:
an image sensor configured to capture an image of a subject; and
an image processor configured to:
calculate a ratio between a first plurality of pixel values captured by the image sensor and a second plurality of pixel values whose reference position is shifted relative to the first plurality of pixel values in a main scanning direction to obtain a third plurality of pixel values; and
detect an abnormal pixel in the third plurality of pixel values,
wherein the image processor is configured to set a shift amount of the reference position of the second plurality of pixel values relative to the first plurality of pixel values in the main scanning direction, to be larger than a pixel width detected by the image processor.

* * * * *